US 6,707,210 B2

(12) United States Patent
Hsieh

(10) Patent No.: US 6,707,210 B2
(45) Date of Patent: Mar. 16, 2004

(54) DUAL WIRE STATOR COIL FOR A RADIATOR FAN

(76) Inventor: Hsin-Mao Hsieh, No. 6, East Section, Chiao Nan Li, Industrial 6th Rd., Pingtung City, Pingtung Hsien (TW)

( * ) Notice: Subject to any disclaimer, the term of this patent is extended or adjusted under 35 U.S.C. 154(b) by 0 days.

(21) Appl. No.: 09/820,901

(22) Filed: Mar. 30, 2001

(65) Prior Publication Data

US 2002/0140310 A1 Oct. 3, 2002

(51) Int. Cl.[7] .............. H02K 1/00; H02K 3/00; H02K 17/00; H02K 19/00; H02K 21/00
(52) U.S. Cl. ....................... 310/179; 310/208
(58) Field of Search ................. 310/197, 208

(56) References Cited

U.S. PATENT DOCUMENTS

| | | | | | |
|---|---|---|---|---|---|
| 4,634,912 A | * | 1/1987 | Heyraud | ..... | 310/198 |
| 4,665,331 A | * | 5/1987 | Sudo et al. | ..... | 310/156.08 |
| 4,675,591 A | * | 6/1987 | Pleiss | ..... | 318/773 |
| 4,677,332 A | * | 6/1987 | Heyraud | ..... | 310/184 |
| 4,849,695 A | * | 7/1989 | Muller et al. | ..... | 324/252 |
| 4,857,817 A | * | 8/1989 | Kugiota | ..... | 318/696 |
| 5,152,480 A | * | 10/1992 | Adams et al. | ..... | 244/134 D |
| 5,430,600 A | * | 7/1995 | Burns | ..... | 361/153 |
| 5,748,760 A | * | 5/1998 | Button | ..... | 381/412 |
| 6,087,592 A | * | 7/2000 | Nagel et al. | ..... | 174/120 R |
| 6,144,281 A | * | 11/2000 | Lorris | ..... | 336/200 |
| 6,338,939 B1 | * | 1/2002 | Clarke et al. | ..... | 29/603.14 |
| 6,437,555 B1 | * | 8/2002 | Pioch et al. | ..... | 324/127 |
| 6,437,675 B1 | * | 8/2002 | Chu | ..... | 336/100 |
| 6,456,888 B1 | * | 9/2002 | Skinner et al. | ..... | 607/116 |
| 6,477,427 B1 | * | 11/2002 | Stolz et al. | ..... | 607/116 |
| 6,479,997 B1 | * | 11/2002 | Westphal et al. | ..... | 324/318 |
| 6,481,092 B2 | * | 11/2002 | Buttrick et al. | ..... | 29/602.1 |
| 6,570,819 B1 | * | 5/2003 | Clark et al. | ..... | 367/142 |
| 6,590,394 B2 | * | 7/2003 | Wong et al. | ..... | 324/318 |
| 6,611,189 B2 | * | 8/2003 | Sigl | ..... | 336/198 |
| 6,622,500 B1 | * | 9/2003 | Archibald et al. | ..... | 62/173 |

* cited by examiner

Primary Examiner—Thomas M. Dougherty
Assistant Examiner—Pedro J. Cuevas
(74) Attorney, Agent, or Firm—Jones, Tullar & Cooper, P.C.

(57) ABSTRACT

A stator coil for a radiator fan, the stator coil consists of at least two enamel wires co-axially wound together. Each of the enamel wires has opposite first and second ends extended out from the stator coil. The first and second ends of the at least two enamel wires optionally connected in different connection ways so that the stator coil is optionally formed as a uni-coil winding in parallel connection, a uni-coil winding in series connection or a multiple-coil winding to satisfy different requirements of the radiator.

4 Claims, 5 Drawing Sheets

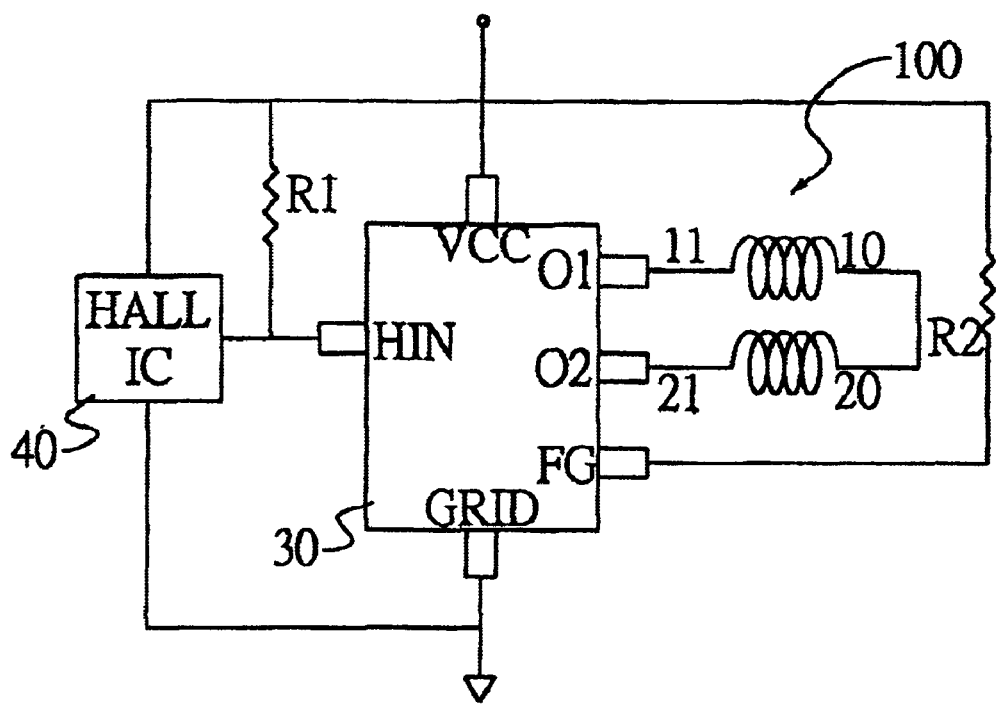
F I G. 6

DUAL WIRE STATOR COIL FOR A RADIATOR FAN

BACKGROUND OF THE INVENTION

1. Field of the Invention

The present invention relates to a dual wire stator coil of a brushless direct current micromotor for a radiator, the stator coil particularly having at least two enamel wires co-axially wound together to reduce the time of a winding process in production and minimize the required quantity of stock of finished products.

2. Description of Related Art

Radiators with brushless direct current micromotors have many applications in industry. A tendency of these applications is the continuous pursuit of reduction in their sizes. For example, as for notebook personal computers from laptops to palmtops, minimization of their size is still a major object for manufacturers to pursue. Therefore, sizes of micro radiators for the notebook personal computers also should be reduced accordingly.

A conventional radiator normally has a stator coil with a double-coil winding provided therein. In order to minimize the size of the stator coil, the double-coil winding is replaced by a uni-coil winding, which has two opposite terminal ends thereof electrically connected with an alternating-current circuit. When an alternating current runs through the stator coil, an alternating magnetic field is produced by the stator coil to drive a rotor to run. The alternating-current circuit is made in an integrated circuit die so that the size of the stator is minimized.

However, the conventional stator coil with the uni-coil winding still has following disadvantages:

1. the uni-coil winding is wound by using only one enamel wire, but a double-coil winding is wound by using two enamel wires co-axially, so that winding time cost of a uni-coil winding is more than the cost of a double-coil winding, therefore the production efficiency of the uni-coil winding is low, and the production cost of the uni-coil winding is high; and
2. manufacturers still have to keep double-coil windings in the inventory in addition to the uni-coil windings, so the stock level is unnecessarily high.

Therefore, it is an objective of the invention to provide an improved stator coil for a radiator fan to mitigate and/or obviate the aforementioned problems.

SUMMARY OF THE INVENTION

A main object of the present invention is to provide a stator coil of a brushless direct current micromotor for a radiator, the stator coil having at least two enamel wires co-axially wound together, and each enamel wire having first and second ends respectively extended out from the stator coil. The first and second ends of the at least two enamel wires of the stator coil are optionally connected in different ways, so that the stator is optionally formed as a uni-coil winding in series connection, a uni-coil winding in parallel connection, or a multiple-coil winding to respectively satisfy different requirements of the micromotors of the radiators. Time spent to wind the stator coil with multiple enamel wires wound co-axially together is low.

Another object of the invention is to provide a stator coil of a brushless direct current micromotor for a radiator, as the stator coil can be optionally connected to form a uni-coil winding, or a double-coil winding, whereby only one type of the stator coil is needed to be kept in inventory to meet all requirements, so that the stock level is low.

A further object of the invention is to provide a stator coil of a brushless direct current micromotor for a radiator, wherein the stator coil is connected with a drive IC for providing an alternating-current circuit to the stator coil, so that the size of the stator coil for the radiator is minimized.

Other objects, advantages and novel features of the invention will become more apparent from the following detailed description when taken in conjunction with the accompanying drawings.

BRIEF DESCRIPTION OF THE DRAWINGS

FIG. 6 is a scheme of an electrical circuit of the stator connected with a drive IC.

DETAILED DESCRIPTION OF THE PREFERRED EMBODIMENT

Figure 1:
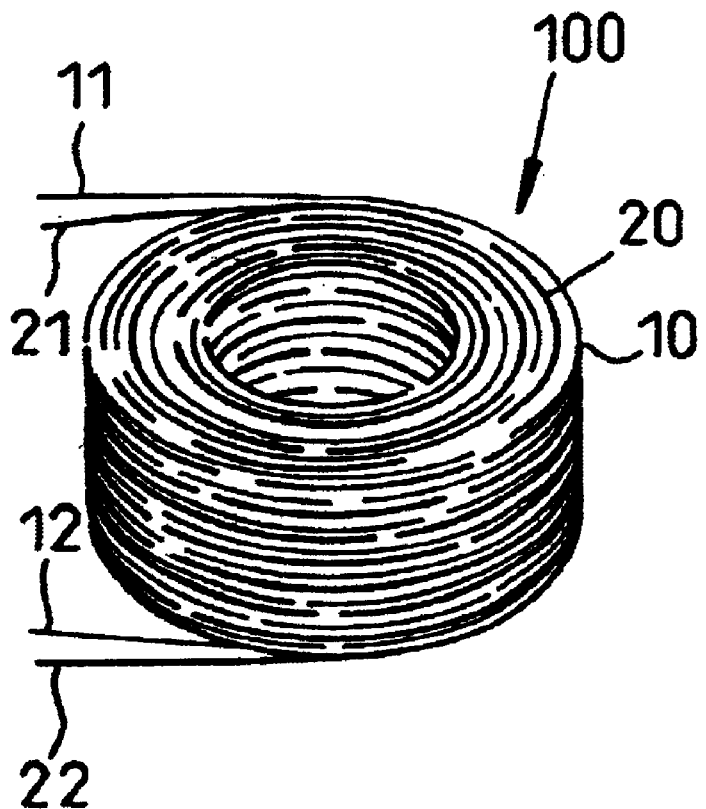
FIG. 1 is a perspective view of a stator coil in accordance with the invention.
Figure 2:
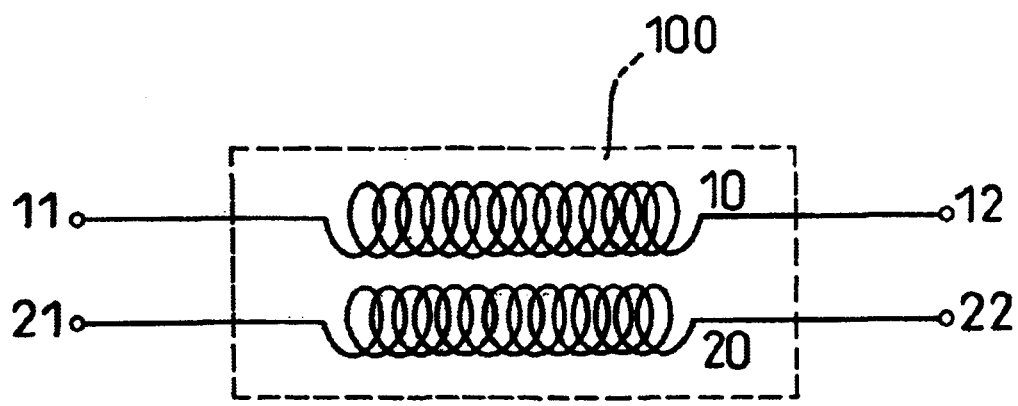
FIG. 2 is a scheme of an equivalent electrical circuit of the stator coil in accordance with the invention.

The present invention relates to a stator coil of a brushless direct current micromotor for a radiator, the stator particularly including at least two enamel wires co-axially wound together. As shown in FIG. 1, an embodiment of the stator the invention has first and second enamel wires (10, 20) wound co-axially to form a stator coil (100). The first enamel wire (10) has first and second ends (11, 12) respectively extended out from the stator coil (100). The second enamel wire (20) also has first and second ends (21, 22) respectively extended out from the stator coil (100). The stator coil (100) has an equivalent circuit as shown in FIG. 2. The stator coil (100) is connected with a drive circuit in different connection ways in accordance with different requirements of the radiators.

Figure 3:
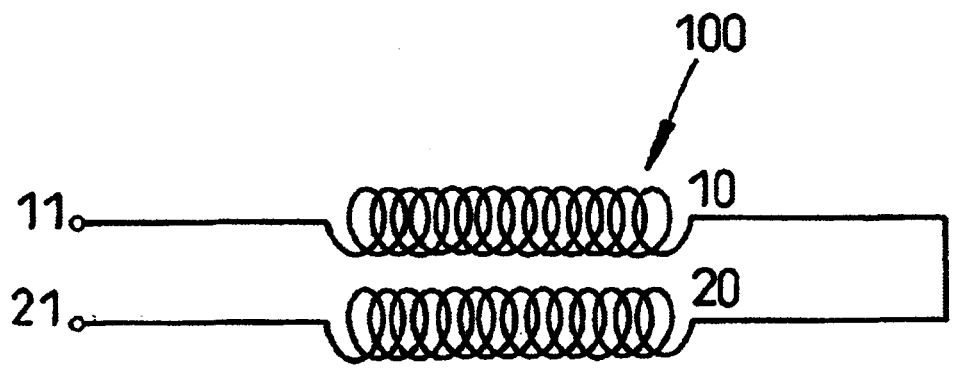
FIG. 3 is a scheme of an equivalent electrical circuit of a first connection embodiment of the stator coil in accordance with the invention, showing two enamel wires being connected to form a series uni-coil winding.

In a first embodiment as shown in FIG. 3, the first end (11) of the first enamel wire (10) and the first end (21) of the second enamel wire (20) of the stator coil (100) act as two terminal ends. The second end (12) of the first enamel wire (10) is connected with the second end (22) of the second enamel wire (20), so that the first enamel wire (10) and the second enamel wire (20) are connected in a series connection, and the stator coil (100) is equal to a uni-coil winding.

Figure 4:
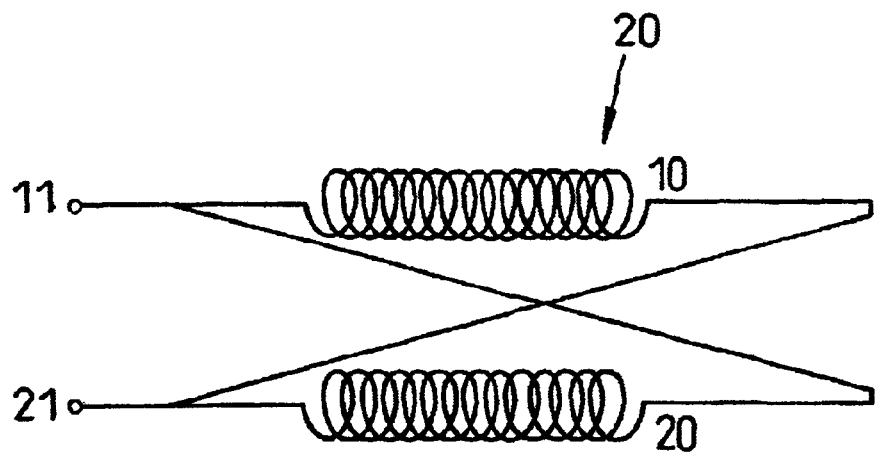
FIG. 4 is a scheme of an equivalent electrical circuit of a second connection embodiment of the stator coil in accordance with the invention, showing two enamel wires being connected to form a parallel uni-coil winding.

When the first end (11) of the first enamel wire (10) and the first end (21) of the second enamel wire (20) act as two terminal ends, and the first enamel wire (10) is connected with the second enamel wire (20), the first and second enamel wires (10, 20) are connected in a parallel connection as shown in FIG. 4. The stator coil (100) is also equal to a uni-coil winding which is adapted to work under a large outgoing current, and to produce a high operating speed of the micromotor.

Figure 5:
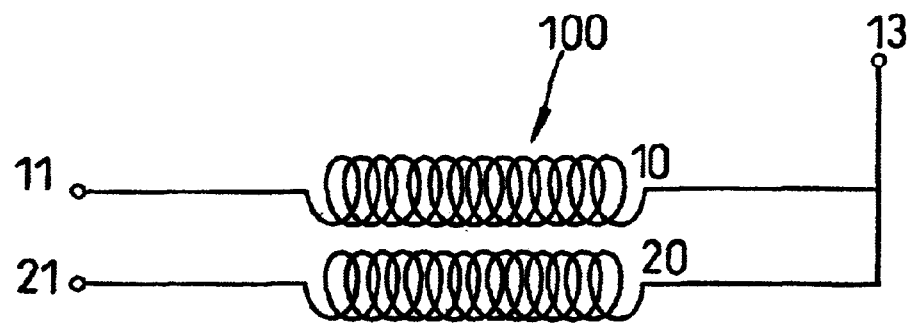
FIG. 5 is a scheme of an equivalent electrical circuit of a third connection embodiment of the stator in accordance with the invention, showing two enamel wires being connected to form a double-coil winding.

Referring to FIG. 5, if the second ends (12, 22) of the first and second enamel wires (10, 20) are connected together to be a first terminal end (13), the first and second enamel wires (10, 20) between the first ends (11, 21) and the first terminal end (13) respectively act as two independent windings, and the stator coil (100) is equal to a double-coil winding.

It can be appreciated that the opposite first and second ends of the at least two enamel wires of the stator coil (100) can be optionally connected in different connection ways, so that the stator (100) is optionally formed as a uni-coil winding in series connection, a uni-coil winding in parallel connection or a double-coil winding to respectively satisfy different requirements of the radiators. The time spent to wind the stator coil with the multiple enamel wires is low. and the required stock of the stator coil is also low because there is only one type of the stator coil kept in the inventory.

Figure 7:
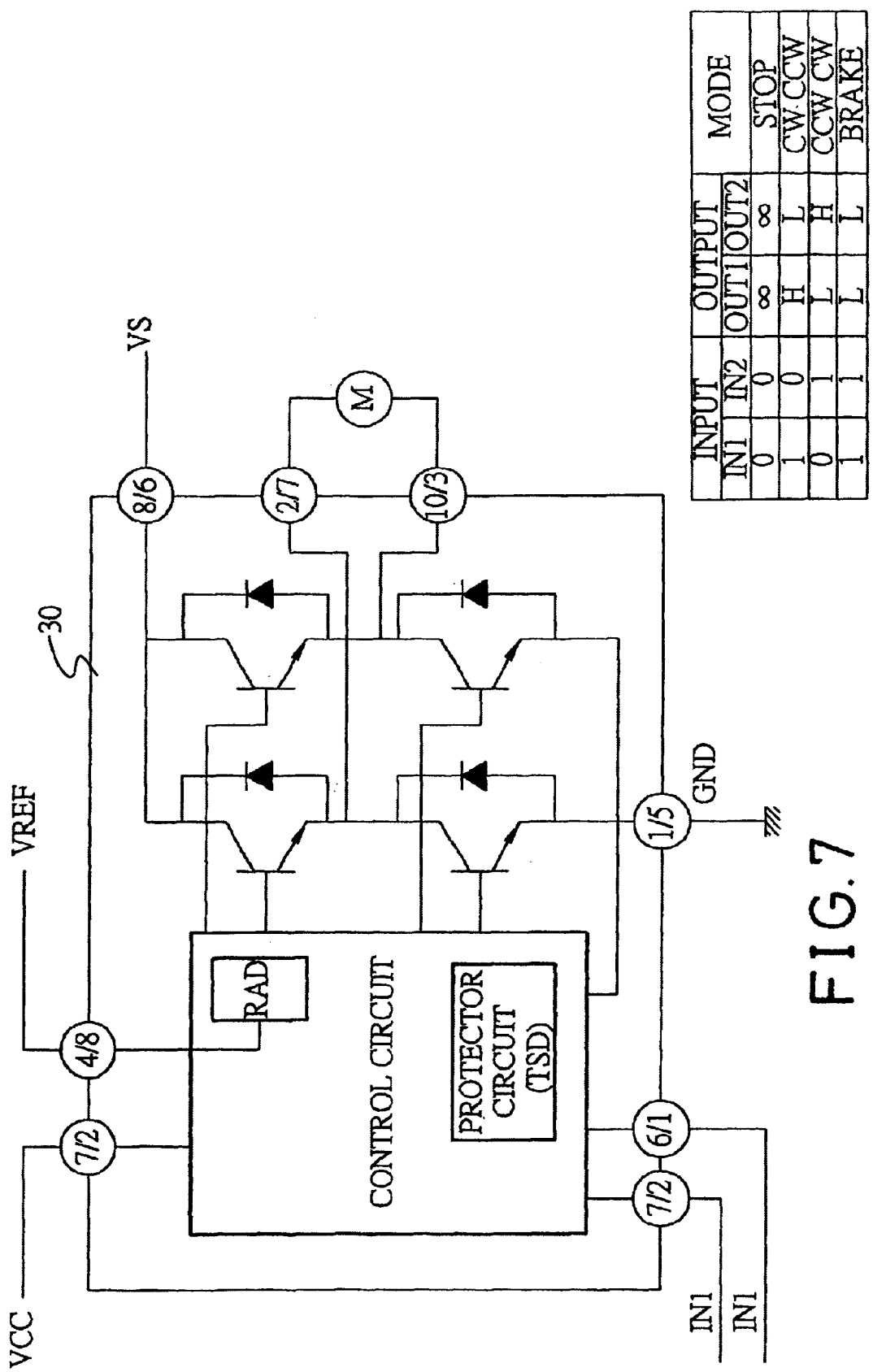
FIG. 7 is a scheme of an electrical circuit of and a true value table of the drive IC.

With reference to FIG. 6, the stator coil (100) with the first and second enamel wires (10, 20) connected in the series connection has the terminal ends (11, 21) thereof respectively connected with two output ends O1 and O2 of a drive IC (30). An input end Hin of the drive IC (30) is connected with a Hall IC (40), which is intended to monitor magnetic variation of the stator coil (100). In the embodiment of the invention, the drive IC (30) is a bridge driver TA7291P/S made by TOSHIBA. From a scheme and a true value table of the TA7291P/S of the driver IC (30) shown in FIG. 7, it can be understood that the output ends O1 and O2 of the drive IC (30) alternatively output high voltage. When a direct current is input to the drive IC (30), an alternating high voltage is output to the terminal ends (11, 21) of the stator coil (100) via the output ends O1 and O2. As an alternating current is running in the stator coil (100), a rotor of the motor is driven to run by an alternating magnetic field produced by the stator coil (100).

From the above description, it is noted that the invention has the following advantages:

1. as the stator coil includes at least two enamel wires wound co-axially together, the time spent to wind the stator coil is low;

2. the required stock of the stator coil is also low because there is only one type of the stator coil kept in inventory; and 3. the size of the stator coil of the micromotor for the radiator is minimized.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A dual wire stator coil for a brushless direct current (DC) motor radiator fan, the dual wire stator coil having at least two enamel wires co-axillary wound together, wherein the at least two enamel wires are connected in such a way that a uni-coil and a dual coil winding are selectively formed, wherein the winding is connected with a drive IC that outputs alternating current to the winding, wherein the drive IC further connects to Hall IC that is intended to monitor magnetic variation of the stator coil.

2. The dual wire stator coil as claimed in claim 1, wherein each of the at least two enamel wires has opposite first and second ends extending out from the dual wire stator, wherein the two enamel wires have their first and second ends connected in series so as to form the uni-coil winding.

3. The dual wire stator coil as claimed in claim 1, wherein each of the at least two enamel wires has opposite first and second ends extending out from the dual wire stator, wherein the two enamel wires have their first and second ends connected in parallel so as to form the uni-coil winding.

4. The dual wire stator coil as claimed in claim 1, wherein each of the at least two enamel wires has opposites first and second ends extending out from the dual wire stator, wherein the two enamel wires have their first and second ends connected in series so as to form the dual coil winding that has three terminal ends respectively connected with two output ends of the drive IC and a DC power source.

* * * * *